April 19, 1966
A. L. DIAMOND
3,246,402
EDUCATIONAL DEVICE
Filed July 11, 1963
5 Sheets-Sheet 1
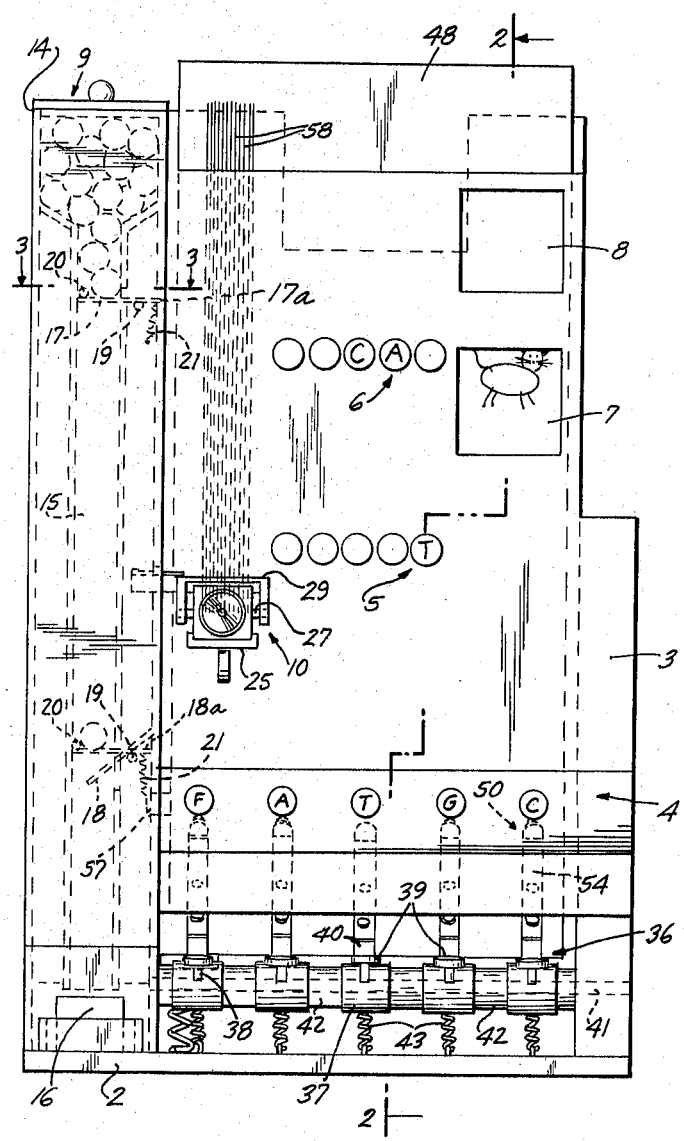
INVENTOR.
A. LEONARD DIAMOND
BY
Curtis, Morris and Safford
ATTORNEYS April 19, 1966  A. L. DIAMOND  3,246,402
EDUCATIONAL DEVICE
Filed July 11, 1963  5 Sheets-Sheet 2
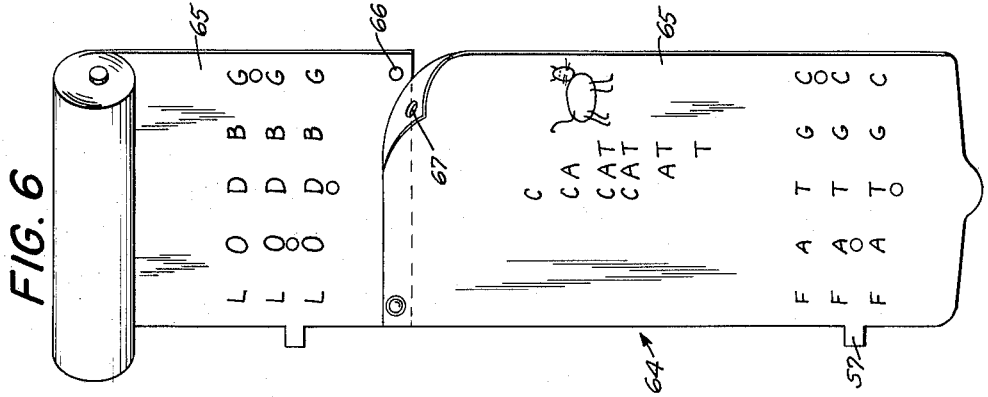
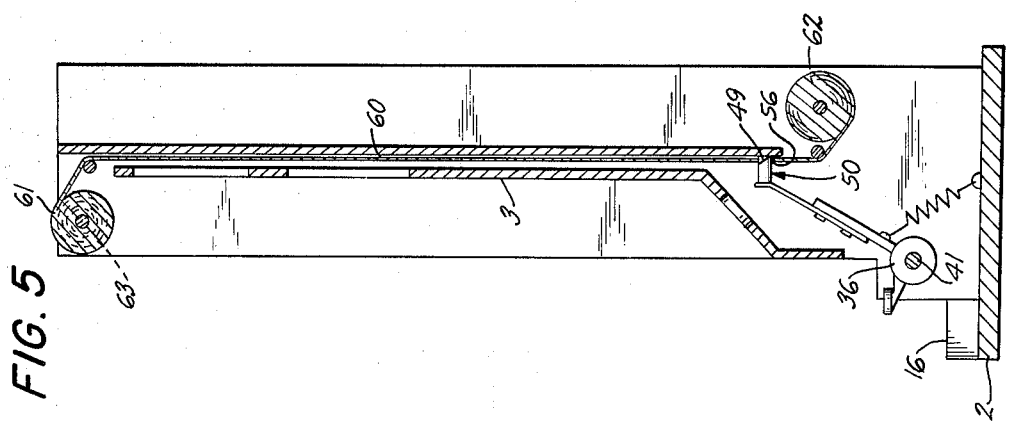
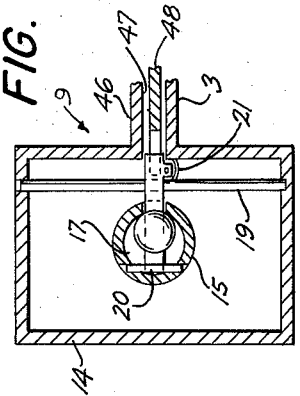
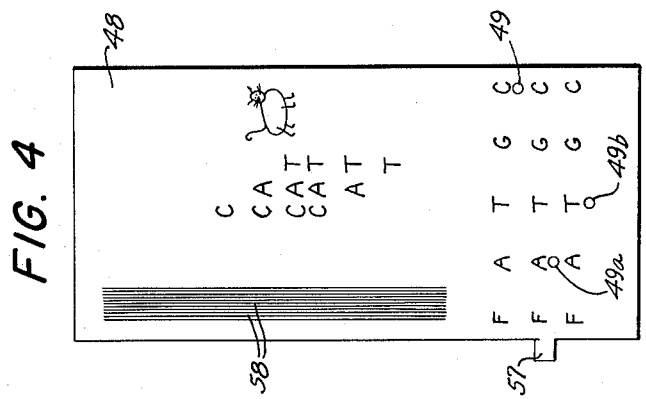
INVENTOR.
A. LEONARD DIAMOND
BY
Curtis, Morris and Safford
ATTORNEYS April 19, 1966  A. L. DIAMOND  3,246,402
EDUCATIONAL DEVICE
Filed July 11, 1963  5 Sheets-Sheet 3

INVENTOR.
A. LEONARD DIAMOND
BY
Curtis, Morris and Safford
ATTORNEYS

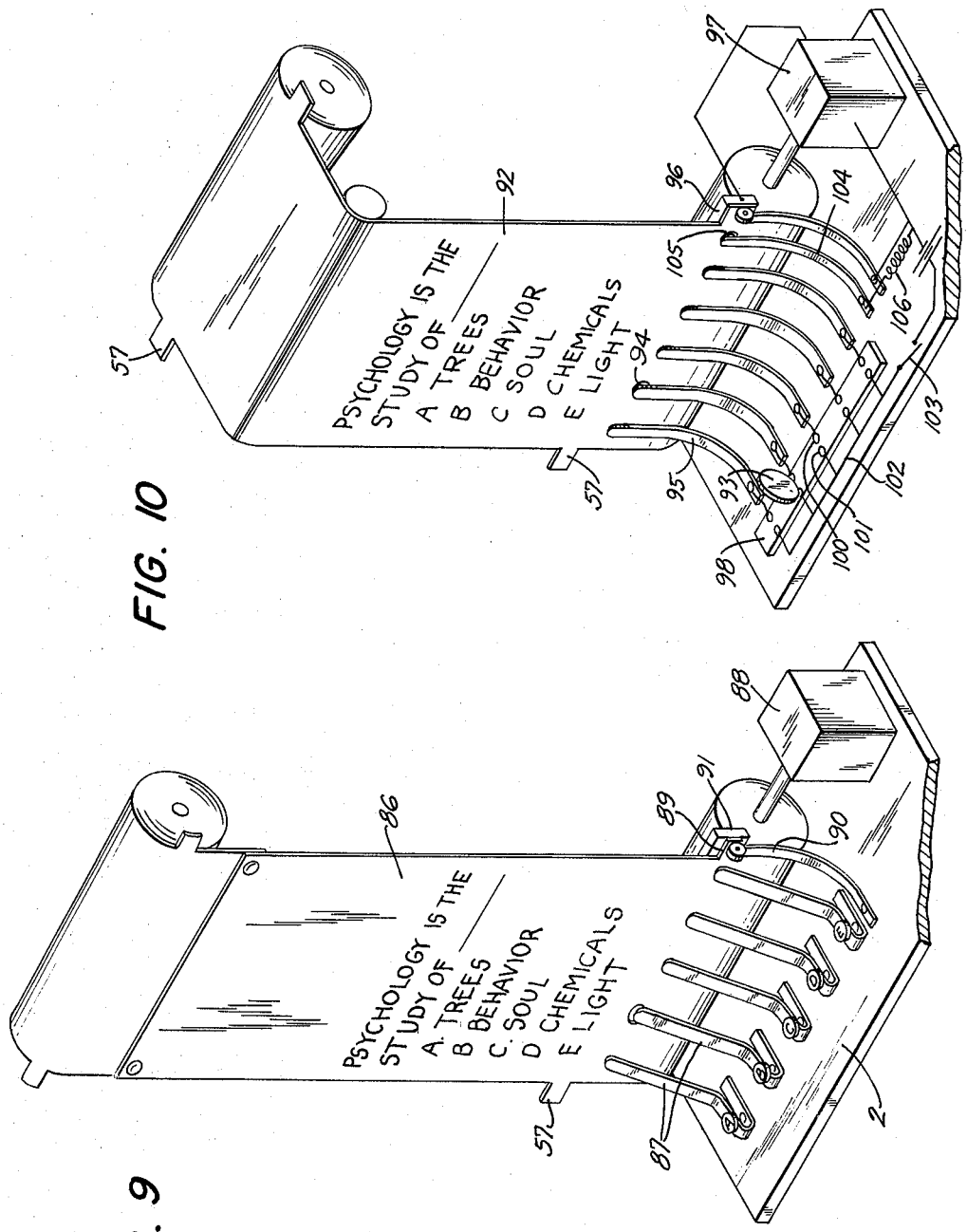

April 19, 1966   A. L. DIAMOND   3,246,402
EDUCATIONAL DEVICE

Filed July 11, 1963   5 Sheets-Sheet 5

INVENTOR.
A. LEONARD DIAMOND
BY
Curtis, Morris and Safford
ATTORNEYS

United States Patent Office 3,246,402
Patented Apr. 19, 1966

3,246,402
EDUCATIONAL DEVICE
Aaron Leonard Diamond, 644 Ikemaka Place,
Kailua, Hawaii
Filed July 11, 1963, Ser. No. 294,440
8 Claims. (Cl. 35—9)

The present invention relates to educational devices and more particularly to improvements in devices for assisting an individual in learning or for testing his knowledge.

Educational devices for assisting individuals in learning have heretofore been provided, but they have not been used extensively because they either fail to produce a motivating appeal in the individual, usually a child, or are so complicated or expensive as to bar them from common use. The deficiencies of prior machines extend from those used by children of preschool age in learning, for example, how to spell simple words, to the more sophisticated types of machines used by adult students in answering, for example, multiple choice questions.

One of the objects of the present invention is to provide an educational device of the type indicated, for either simple or complex exercises, which may be manufactured and sold at a relatively low cost to adapt them for extensive use.

Another object is to provide an educational device of the type indicated which is power operated and automatically controlled to actuate a reinforcing mechanism and advance successive problems to be solved by the operator of the device.

Another object is to provide an educational device of the type indicated which is adapted for a number of different uses such as progressively solving successive steps of a single problem or selecting a single one of a plurality of answers to a multiple choice question either for teaching or for testing.

Still another object is to provide an educational device of the type indicated having a strong motivating appeal to the operator and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a front elevational view of one form of educational device incorporating the novel features of the present invention;

FIGURE 2 is a sectional view in side elevation taken on line 2—2 of FIGURE 1 to show the power spring for automatically actuating a card as controlled by manually operable keys;

FIGURE 3 is a transverse sectional view taken on line 3—3 of FIGURE 1 to show one of the trap doors of the reinforcement mechanism for controlling the delivery of a reward;

FIGURE 4 is a side elevational view of a card used in the device illustrated in FIGURES 1 and 2.

FIGURE 5 is a sectional view similar to FIGURE 2 showing a device of modified construction and incorporating a continuous web operated by a power spring and controlled manually by key actuated detents;

FIGURE 6 is a perspective view of a series of individual cards detachably connected to each other to form a continuous web of the type illustrated in FIGURE 5;

FIGURE 9 is a perspective view similar to FIGURE 7 and showing a web for use in a device for answering multiple choice questions;

FIGURE 10 is a perspective view similar to FIGURE 9 and showing how a web may be moved by a coin controlled mechanism.

Figure 8:
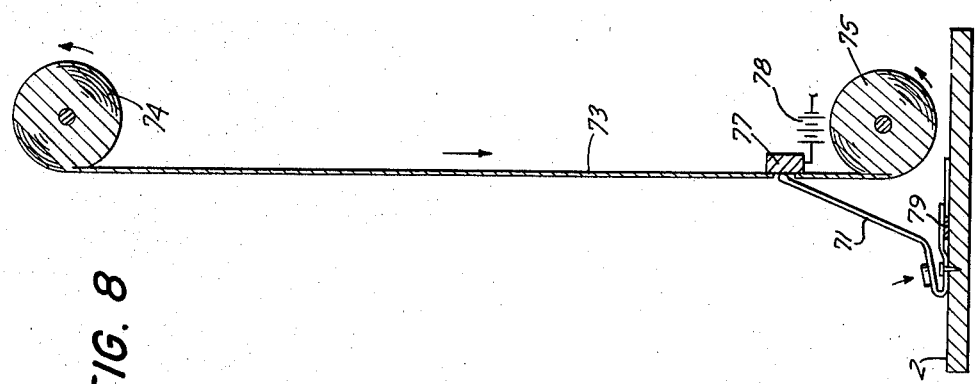
FIGURE 8 is a side elevational view of the device illustrated in FIGURE 7 and showing how an electrical connection is completed through an aperture in the web.

Referring first to FIGURES 1 to 4 of the drawings, one form of a manually controlled power operated apparatus is illustrated for moving a sheet through successive increments of movement as sucessive steps of the problem are solved, and for operating reinforcing and audible sound reproducing mechanisms. The apparatus as illustrated comprises a base frame 2, see FIGURES 1 and 2, on which board 3 is mounted. The board 3 may extend vertically or at an angle to the vertical and has three separate sets of horizontally aligned window openings 4, 5 and 6 and a pair of larger vertically aligned window openings 7 and 8. The reinforcing mechanism 9 is located at the left hand side of the board 3 and the sound reproducing mechanism 10 is located adjacent the reinforcement mechanism at the front of the board.

The reinforcing mechanism 9 comprises a magazine 14 for containing some article of interest to the individual, such as a child, and these articles may be in the form of pellets of sweet nutritious food, small trinkets or small colored tokens which might be exchanged by the child for whatever rewards a parent might establish. A tube 15 extends downwardly from the magazine 14 and terminates above a tray 16 adjacent the base plate of the machine to which the reinforcement article is delivered from the tube. A pair of trap doors 17 and 18 extend across the tube 15 in vertically spaced relation, see FIGURES 1 and 3. The trap doors 17 and 18 are identical and each is mounted to rock on a pivot rod 19 and is actuated to one position against a stop 20 by a spring 21. The trap doors 17 and 18 extend on opposite sides of the pivot rod 19 and the extending side connected to the spring 21 projects inwardly toward the board 3 and is constructed of a thin flexible material.

The sound reproducing mechanism 10 is in the form of a conventional phonograph having a needle 24, see FIGURE 2, adapted to engage a sound track on the movable sheet, later to be described in detail. The phonograph 10 is mounted to slide on a platform 25 projecting outwardly from the front of the board 3 and the board has an opening 26 therein through which the needle 24 passes as the speaker is slid rearwardly with respect to the board 3. Trunnions 27 project from the opposite sides of the phonograph 10 and extend into curved slots 28 in the arms of a yoke 29 mounted to rock on a pivot 30. Thus, when the yoke 29 is rocked counter-clockwise from the position illustrated in FIGURE 2, the phonograph 10 slides rearwardly on the platform 25 to position its needle 24 in the opening 26 in the board 3. Yoke 29 is rocked on its pivot 30 by a rod 31 pivotally connected to the yoke and to one end of each of a pair of arms 32 and 33, respectively, for actuating the link rod in opposite directions.

Located on the base frame 2 at the lower end of the board 3 are a series of manually operable keys 36. The keys 36 are arranged in side by side relationship and of a number corresponding to the number of characters to be used. For example, there may be a key for each letter in the alphabet and each numeral from 0 to 9, but in the illustrated embodiment only five keys are illustrated corresponding to the letters F, A, T, G and C. Each key comprises a hub 37 having a generally radial finger 38 with a flat horizontal striking surface 39 and a radial arm 40 projecting at an angle to the finger 38. The plurality of keys 36 are mounted in parallel side by side relationship on a common rod 41 extending between upright sides of the base frame 2 and mounted between adjacent keys are spacers 42. Each key 36 is rocked clockwise by a spring 43 acting between its arm 40 and the base frame 2.

A backing plate 46 is provided at the rear of the board 3 in spaced relation thereto to provide a slot 47 therebetween through which a sheet 48 is moved for presenting a problem to be solved. In the embodiment of the invention illustrated in FIGURES 1 to 4 the sheet 48 is in the form of a card of stiff cardboard or a plastic and has indicia thereon for presenting the problem or series of problems to be solved. In the particular illustration, the problem presented is that of spelling the simple word "cat," which, in turn, presents a series of successive problems in correctly selecting each of the successive letters of the word. As shown in FIGURE 4, the indicia marked on the card 48 comprises the series of letters F, A, T, G and C in three spaced rows for successive alignment with the horizontal window openings 4 in the board 3, a series of vertically spaced letters and combination of letters for alignment with the window openings 5; and, a corresponding group of letters and combination of letters in reverse order for alignment with the window openings 6. At the right hand side of the card as viewed in FIGURE 4, the object corresponding to the word to be spelled, such as a cat, is illustrated for successive illustration in the window openings 7 and 8.

In accordance with the present invention a power operating mechanism is provided for positively driving the card 48 through successive increments of movement as controlled by the keys 36 and corresponding apertures 49 in the sheet or card 48. The power operating mechanism comprises a platform 51 engaged by one side of the card as it is moved into the slot 47 and a power spring or power springs 52 opposing the movement of the card. In the illustrated embodiment, the card 48 is moved vertically into the slot 47 through an open end at the top of the board 3 so that the bottom edge of the card engages the spring pressed platform 51, but it will be understood that the card can be inserted through an open side of the slot for movement laterally therein. The apertures 49 in the card are arranged adjacent the letters of the word to be spelled at successively lower levels. For example, the first aperture 49 is shown positioned under the letter C of the card, see FIGURE 4, the next aperture 49a is positioned below the letter A of the second row of indicia while the third aperture 49b is shown positioned below the letter T in the third row of indicia. Each of the apertures 49 provides a horizontal shoulder 53 at the bottom thereof, see FIGURE 2, for engagement by a detent 50 on the corresponding key 36. As shown most clearly in FIGURE 2 each detent 50 is mounted at the upper end of a leaf spring 54 attached to the arm 40 projecting from the hub 37 of its key. Each detent 50 is in the form of a horizontally extending pin having an angularly beveled end to provide an inclined cam surface 55 and a locking shoulder 56. The ends of the detents 50 are inclined from the bottom toward the left as viewed in FIGURE 2 so that when a card 48 is inserted into the slot 47, the end of the card will engage the cam surface 55 and move the detent toward the left to permit the card to pass thereby, by engaging its locking shoulder 56 with the shoulder 53 at the bottom of an aperture 49 to lock the card against upward movement.

The card 48 is also provided with a tab 57 projecting laterally from one side for engaging and operating the inwardly projecting ends of the trap doors 17 and 18.

Also at the left hand side of the card is a series of sound reproducing tracks 58 with each track having the same words recorded therein such as the sound of the individual letters as they are successively selected and the pronunciation of the complete word at the completion of the proper spelling. One form of device incorporating the present invention having now been described in detail, the mode of operation is next explained.

A card 48, such as the one illustrated in FIGURE 4, is inserted through the open end of the slot 47 at the top of the device and pressed downwardly until the upper row of letters F, A, T, G and C is at or below the row of window openings 4. When the lower end of the card 48 engages the spring pressed platform 51, the latter is depressed against the action of spring 52. During the downward movement of the card 48 its laterally projecting tab 57 first engages the extension 17a of trap door 17 and flexes it relative to the stop 20 as it moves thereby, and then engages the extension 18a of the trap door 18 which flexes to permit the tab to pass in the same way. Adjacent its lowermost position, the platform 51 engages and rocks in the lever 33 counterclockwise to raise the actuating rod 31, rock the yoke 29 and move the needle 24 on the phonograph 10 into engagement with one of the sound tracks 58 in the card.

Upon release of the card 48 the power spring 52 moves it upwardly until the detent 50 on the key 36 corresponding to the letter C will enter the aperture 49 so that its shoulder 56 will engage the shoulder 53 in the card and hold it against the action of the spring. At this time the letters F, A, T, G and C will be aligned in the row of horizontal window openings 4, the letters C, A and T will appear in the three window openings 5 at the right hand side of the row, no letters will appear in the upper row of window openings 6 and an illustration of a cat will appear in the window opening 7.

When the key 36 corresponding to the letter C is struck and depressed the detent 50 will be withdrawn from the aperture 49 which releases the card for upward movement under the action of the power spring 52 until the detent on the key 36 corresponding to the letter A engages the aperture 49a to stop the card after a predetermined upward increment of movement. The second row of letters F, A, T, G and C will then appear in the lower horizontal row of window openings 4, the letters A and T will appear in the row of window openings 5 and the letter C will now appear in the row of openings 6. During this upward movement of the card 48 the sound tracks 58 on the card will have moved with respect to the needle 24 of the phonograph 10 and enunciated the letter C. These operations will be repeated when the key 36 corresponding to the letter A is struck to release the card for another increment of movement upwardly. The third row of letters F, A, T, G and C then will be aligned with the window openings 4, the letter T only will occur in the right hand window opening of the row 5 and the letters C and A will appear in the upper row of window openings 6. During this last increment of movement of the card the letter A will have been enunciated by the phonograph. Upon manual operation of the key 36 corresponding to the letter T the card 48 will be completely released and moved upwardly to the full extent of the spring 52. During this movement the word CAT will appear in the upper row 6 of window openings, the illustration of the cat will move from the window opening 7 to the window opening 8 and the phonograph 10 will have enunciated the letter T and the spelled word CAT, the platform 51 will have rocked lever 32 and acting through rod 31 and yoke 29 to slide the phonograph 10 away from the board 3 and thereby withdraw the needle 24 from sound track 58 on the card. Also the tab 57 on the card 48 will have moved past the extension 18a and rocked the trap door 18 against the action of spring 21 to release the article constituting the reinforcement which falls by gravity into the tray 16 where it may be obtained. After the tab 57 has moved past the extension 18a the spring 21 will rock the trap door 18 to closed position, and when the card is completely removed from the device the tab will engage the extension 17a and rock the trap door 17 to release an article from the magazine 14 which falls onto the trap door 18 for operation by the next card. Thus, the operation of the sheet 48 is controlled by an interengaging means having manually selective elements or keys and apertures in the sheets engaged by detents on the keys, and the sheet is positively advanced by a power operating mechanism through successive increments of movement to present successive problems for solution.

FIGURE 5 illustrates a modified construction in which a web 60 is used in place of separate individual sheets 48 and the indicia on the web presents successive problems which would otherwise be presented by the separate cards of FIG. 4. The web 60 extends between reels 61 and 62 adjacent the top and bottom of the board 3 and one of the reels 61 has a helical coil spring 63 for positively moving the web when released. The web 60 has apertures 49, the same as the card 48 in FIGURE 4, and the movement of the web is controlled in the same manner as previously explained by means of keys 36 and detents 50 which enter the apertures and engage shoulders 56 on the sheet. Thus, the web 60 moves in successive increments corresponding, for example, to the letters of the word to be spelled to present successive problems to be solved.

FIGURE 6 illustrates a further modification of a web 64 generally similar to the web 60 in FIGURE 5, but comprising a plurality of separate sheets 65 connected to each other. To this end, the lower edge of each sheet 65 is provided with a fastening means such as the male fitting 66 of a snap fastener and the upper edge is provided with female fittings 67 so that the sheets may be connected by merely snapping one on the other. Thus, a web 64 of detachable sections 65 may be made and in which different problems may be substituted in the web when and if desired. It will be noted that each of the detachable sheets 65 is generally similar to sheet 48 and has tab 57.

Figure 7:
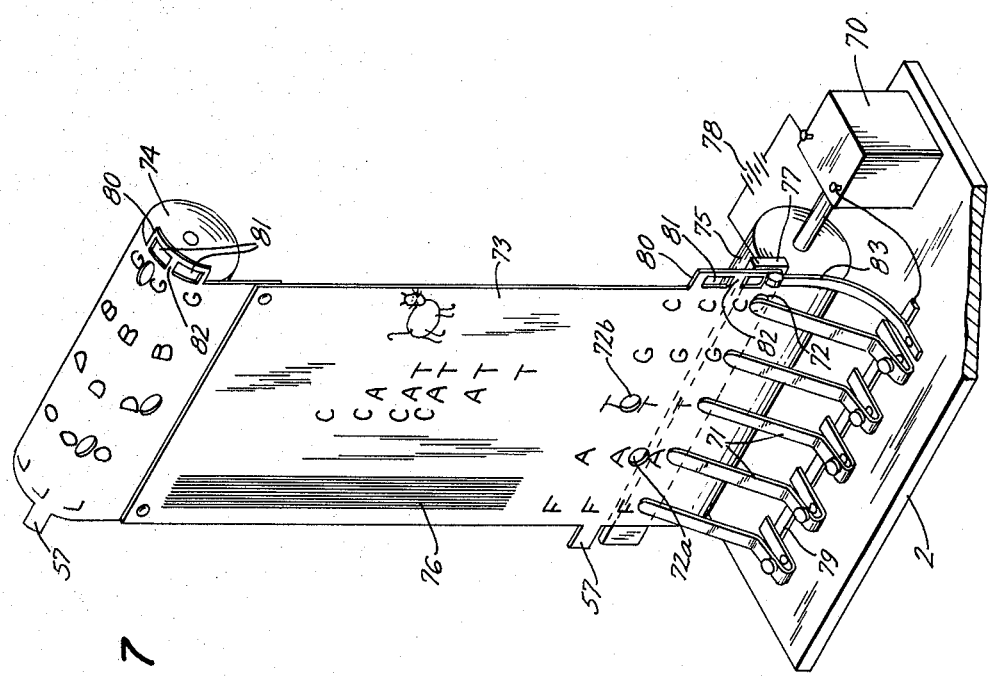
FIGURE 7 is a perspective view of a further modified construction in which the power operating mechanism is an electric motor and illustrating switches controlled by apertures in the card or web.

FIGURES 7 and 8 illustrate a further modified construction in which the power driven mechanism for advancing the sheet is an electric motor 70; and the interengaging means for controlling the advance of the sheet are manually operable switch contact keys 71 and apertures 72 in the sheet through which a circuit to the motor is completed when the proper switch contact key is manually actuated. In the illustrated embodiment the sheet is in the form of a continuous web 73, generally similar to the webs illustrated in FIGURES 5 and 6, and extends between reels 74 and 75. For purposes of illustration the web 73 has the same indicia shown thereon as does the card in FIGURE 4 to simplify the explanation. Web 73 is constructed of a flexible electrical insulating material with a sound track 76 impressed therein, and having apertures 72, 72a and 72b at the same locations as in the card illustrated in FIGURE 4.

The switch contact keys 71 in any stopped position of the web 73 are spaced from the web and are aligned with a contact bar 77 at the opposite side of the web. While any suitable circuitry may be used, in the illustrated embodiment the contact bar 77 is shown electrically connected to one side of a source of power, such as an electric battery 78, and the opposite side of the battery is connected to one end of the windings of the electric motor 70. The opposite end of the motor windings are connected to a bus bar 79 underlying and connecting all of the switch contact keys 71. Thus, in any stopped position of the web 73 one aperture 72 corresponding to a particular letter will be in register with the corresponding switch contact key 71. When any of the other contact keys 71 is depressed an electric circuit will not be completed because of the web 73 of insulating material between it and the contact bar 77. However, when the switch contact key 71 corresponding to the proper letter is depressed, it will make contact through the aperture 72 with the bar 77 and complete an electric circuit through the motor 70. Motor 70 then will advance with web 73 until the portion of the web adjacent the aperture moves under the contact and opens the circuit at which time the motor will stop. The apertures 72 may be so formed as to control the movement of the web 73 to the next line of indicia. Preferably, however, a mechanical holding switch is provided in the form of a tab 80 at the opposite side of the web 73 from the tab 57 which operates the reinforcement mechanism and the tab has openings 81 therein with insulating strips 82 therebetween. Overlying the tab 80 is a spring press contact 83 connected to the bus bar 79 for making an electric contact through the openings 81 and insulated from the contact bar 77 by the strips 82. The openings 81 and insulating strips 82 of tab 80 overlap the apertures 72 and web sections therebetween so that once the proper switch contact key 71 is depressed to complete a circuit the initial movement of the web 73 will engage the contact 83 with the contact bar 77 through an opening 81 to maintain the circuit closed until the next row of letters including the next aperture is aligned with a switch contact key. It will be noted that after the spelling of a word such as CAT has been completed the tab 80 will have been removed from between the contact 83 and contact bar 77 to move the entire section of the web 73 having a problem thereon onto the reel 75 and to move the next problem into position. At this time the insulating strip 82 of the next adjacent tab 80 will have moved between the contact 83 and contact bar 77 to stop the movement of the web.

Another modified construction of web 86 is illustrated in FIGURE 9 to adapt the apparatus for multiple choice questions for either learning or testing devices. The arrangement in FIGURE 9 is generally similar to that illustrated in FIGURES 7 and 8 except for the indicia printed on each section of the web and the holding circuit tab. As will be observed by reference to FIGURE 9 a question such as "Psychology Is The Study Of" is printed at the top of the sheet and several multiple choice answers underlie the question. Each of the multiple choice answers are separately marked as by letters and a switch contact key 87, like that illustrated in FIGURES 7 and 8, is provided for each of the multiple choice answers and has the same marking. As in the previous embodiment the manual actuation of the proper switch contact key 87 will complete an electric circuit to a motor 88 and the initial movement of the web 86 will withdraw an insulating tab 89 from between a holding contact 90 and contact bar 91 to immediately advance the web to present the next question, the same as in the embodiment illustrated in FIGURES 7 and 8. Suitable mechanism for recording the correct answer may be incorporated in the machine for testing purposes.

Figure 11:
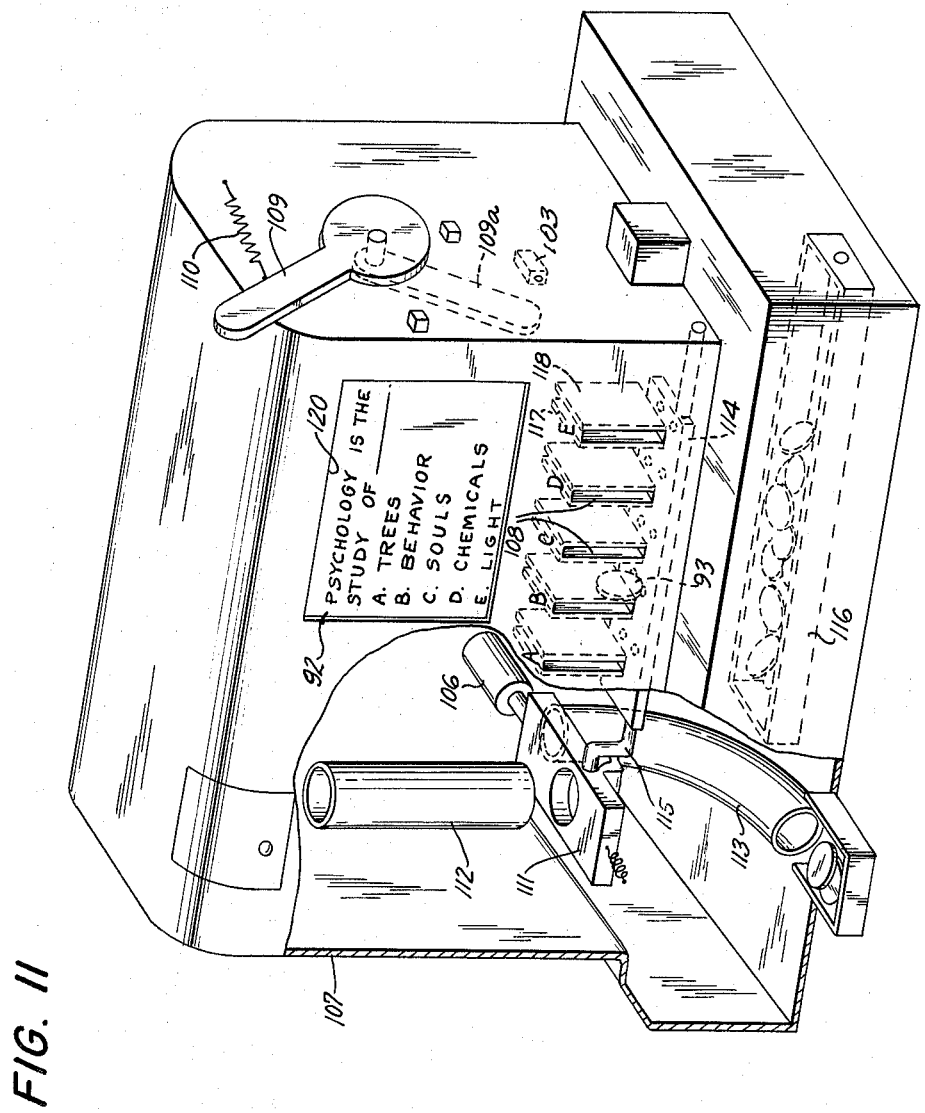
FIGURE 11 is a perspective view of a machine incorporating the coin controlled mechanism of FIGURE 10 for learning or testing by multiple choice questions.

A still further modified construction of device is illustrated in FIGURES 10 and 11 for producing a strong motivating appeal to the individual operating the machine. This type of apparatus simulates a well known coin operated game which appeals to a large group of individuals. However, instead of moving cylinders with matching indicia into line, the device either operates such cylinders to present an indication of whether a particular question has been answered correctly, or not, and if so presents a new question and multiple choice answers, or operates a web such as illustrated in FIGURE 10. For simplicity of explanation the invention is shown applied to a machine for operating the web, but it will be understood that it could be used to operate cylinders having indicia such as the letters of the alphabet and the numerals 0 to 9 printed thereon.

FIGURE 10 illustrates how a continuous web 92, like those shown in FIGURES 7 to 9, can be controlled by metal slugs 93 instead of by manually operable switches. As in FIGURE 9, a contact bar 96 is connected to an electric motor 97. However, in FIGURE 10, each of the contacts 95 is electrically connected to one contact 100 of a corresponding pair of spaced contacts on a terminal board 98, respectively, and the other contact 101 is connected to a common bus bar 102. One pair of spaced contacts 100 and 101 is provided for each contact 95 corresponding to a particular one of a plurality of multiple choice answers. The contacts 101 and 102 of each pair are so spaced as to be bridged by a metal slug 93 as illustrated in FIGURE 10. The common bus bar 102 includes a manually operable control switch 103.

When the operator decides on a particular answer he inserts the metal slug 93 to bridge the contacts 100 and 101 of the branch circuit connected to the particular contact 95 corresponding to the answer selected. The manually operable control switch 103 is then closed and if the contact 95 corresponding to a wrong answer has been selected, then nothing happens. However, if the contact 95 corresponding to the right answer has been selected, a circuit is completed, the motor 97 initiated and the web 92 is advanced to present the next question and the multiple choice answers.

In addition, the electric circuit illustrated in FIGURE 10 includes an additional contact 104 aligned with an additional aperture 105 for operating auxiliary mechanism, such as reinforcing means, after a number of questions are answered correctly, for example, five questions. An electric winding 106, such as a solenoid, is also shown diagrammatically in FIGURE 10 for operating the auxiliary mechanism.

FIGURE 11 illustrates a type of machine in which the web driving and control mechanisms illustrated in FIGURE 10 may be incorporated. This machine comprises a casing 107 having a window opening 120 through which the problem and multiple choice answers on the web 92 may be observed. Positioned in the casing below the window opening 120 are a plurality of slots 108, one for each of the plurality of multiple choice answers, which are adapted to receive metal slugs 93. An arm 109 is provided at one side of the machine which may be manually operated against the action of a spring 110. Arm 109 is connected to an arm 109a at the inside of the casing which engages and closes switch 103 referred to with respect to FIGURE 9, to complete an electric circuit to the motor 97 if a metal slug 93 has been inserted in the proper slot 108.

The completion of the circuit energizes solenoid winding 106 and the solenoid is connected to actuate a slide 111 for moving a slug from a magazine 112 into alignment with a chute 113 for delivery to the exterior of the machine. The arrangement may be such that when each correct answer is completed the aperture 105 in web 92 will be so positioned that solenoid 106 will be actuated, or the arrangement may be such that for each third or fifth answer only will the aperture 105 occur to energize solenoid 106. While the spaced contacts 100 and 101 on the terminal board 98 are shown directly connected to the contacts 95 and bus bar 102, for purposes of illustration, the plurality of spaced terminals are preferably mounted on a pivotally mounted platform 114, see FIGURE 11, which makes contact with leads from the contacts and bus bar in the position illustrated and rocks to a circuit breaking position. The pivotally mounted platform 114 is connected through a crank 115 to the slide 111 so that each time the solenoid 106 is energized and the slide actuated, the pivoted platform rocks through an angle of 90° to cause the metal slugs to roll from the platform into the drawer 116. As shown diagrammatically in FIGURE 11, a pair of spaced guide plates 117 and 118 are provided for each of the spaced terminals 100 and 101 to guide the metal slug from its slot 108 into contact with the spaced terminals and then guide the slugs as they fall from the tilted platform into the drawer 116.

To operate the machine illustrated in FIGURES 10 and 11 a metal slug is inserted in the slot 108 which the player believes to correspond with the correct answer and the arm 109 of the machine is actuated. Movement of the arm 109 closes the control switch 103 and if the metal slug is in the proper slot completes the circuit between the terminals 100 and 101 to the contact 95 in alignment with the aperture 94 in the web 92 to complete an electric circuit. Completion of the electric circuit energizes the electric motor 97 which moves the web 92 to present a new problem. Completion of the circuit also energizes the solenoid 106 to actuate the slide 111 and tilt the platform 114.

It will now be observed that the present invention provides an educational device for either simple or complex exercises which may be manufactured and sold at relatively low cost to adapt it for extensive use. It will also be observed that the present invention provides an educational device which is power operated and automatically controlled to actuate reinforcing mechanism and advance successive problems to be solved by the operator of the device. It will further be observed that the present invention provides an educational device adapted for a number of different uses in solving successive steps of a single problem or selecting a single one of a plurality of answers. It will still further be observed that the present invention provides an educational device which is of simple and compact construction having a strong motivating appeal to the operator and one which is reliable in operation.

While a number of embodiments of the invention are herein illustrated and described it will be understood that additional changes may be made in the structure and arrangement of elements without departing from the spirit or scope of the invention. Therefore, without limitation in this respect, the invention is defined by the following claims.

I claim:
1. An educational device for assisting an individual in learning comprising a base, a board supported on the base and having an observation area comprising at least one window opening therein, a backing plate supported from the base in spaced relation to the board to provide a slot therebetween, a sheet in the slot between the board and backing plate and having indicia thereon presenting a problem and possible answers in the observation area, said sheet having openings forming shoulders at different locations in parallel paths in the direction of movement of the sheet, a detent for each of the plurality of paths on the sheet and adapted to rest on the surface of the sheet, each of said detents being constructed to engage a shoulder, power means connected to move the sheet, and a manually operable key for each detent corresponding to each of the possible answers on the sheet and connected to withdraw the detent from engagement with a shoulder on the sheet for activating the power means to move the sheet to a new position controlled by the engagement of another detent with another shoulder.

2. An educational device for assisting an individual in learning comprising a base, a board supported on the base and having at least one window opening therein, a backing plate supported from the base in spaced relation to the board to provide a slot therebetween having an open side, a card adapted to be inserted into the slot between the board and backing plate through the open side thereof and having educational indicia thereon presenting a problem and possible answers thereto in the window opening, said card having a shoulder for each correct answer at different locations in parallel paths in the direction of movement of the card, a spring pressed plunger yieldingly opposing the movement of the card into the slot, a detent for each of the plurality of paths on the card and adapted to rest on the surface of the card, each of said detents being constructed to permit movement of a card in one direction toward the spring pressed plunger and engaging a shoulder upon movement of the card in the opposite direction, and a manually operable key for each detent corresponding to each of the possible answers and connected to withdraw the detent from engagement with a shoulder on the card when the one corresponding to the correct answer is actuated whereby the spring pressed plunger moves the card to a new position controlled by the engagement of another detent with another shoulder.

3. An educational device in accordance with claim 2 in which the detents have bevelled ends so that the shoulders cam the detents outwardly when the card is moved in one direction into the slot and engage the shoulders when the card is moved in the opposite direction.

4. An educational device in accordance with claim 3 in which each of the keys comprises a hub, a finger piece projecting from the hub and an arm projecting from the hub in angular relation to the finger piece and card, the detent being mounted on the arm, means for pivotally mounting the plurality of keys, and spring means for rocking each key to engage its detent with the surface of the card.

5. An educational device in accordance with claim 2 in which a reinforcement means is provided for delivering an article as a reward when the correct key is operated, said reinforcement means comprising a magazine for the articles at one side of the slot for the card, a trip mechanism for releasing an article, and a laterally projecting tab on the card for operating the trip mechanism as it is moved by the spring pressed plunger.

6. An educational device in accordance with claim 5 in which the board is arranged substantially vertically, the magazine for the reinforcement means has a storage chamber adjacent the top of the board and a trough extending downwardly to a tray adjacent the bottom of the base, a pair of pivotally mounted trap doors arranged in spaced relation along said trough, means for yieldingly holding said trap doors in one position across said trough, said trap doors having flexible extensions projecting into the slot for the card, and the laterally projecting tab on said card moving in the path of said door extensions whereby to flex the extensions when moved in one direction and trip the doors successively when moved in the other direction.

7. An educational device in accordance with claim 2 in which each card has a sound track, a phonograph having a needle for engagement with the sound track, mechanism operated by movement of the card into the slot for engaging the phonograph needle with the sound track on the card, and said spring press plunger moving the card relative to the phonograph needle to produce an audible sound when released.

8. An educational device in accordance with claim 7 in which the phonograph is mounted on a platform for sliding movement thereon, the mechanism operated by movement of the card comprising a linkage connected to slide the phonograph on the platform toward and away from the sound track on the card, and said spring pressed plunger actuating the linkage to move the phonograph from a disengaging to an engaging position.

References Cited by the Examiner

UNITED STATES PATENTS

| | | | |
|---|---|---|---|
| 2,953,859 | 9/1960 | Fink | 35—9 |
| 2,983,054 | 5/1961 | Twyford | 35—9 |
| 3,046,675 | 7/1962 | Schure | 35—9 |
| 3,095,654 | 7/1963 | Cummings | 35—9 |
| 3,096,592 | 7/1963 | Schuster | 35—9 |

EUGENE R. CAPOZIO, *Primary Examiner.*

LAWRENCE CHARLES, JEROME SCHNALL,
*Examiners.*